United States Patent
Adams

(10) Patent No.: US 9,147,293 B2
(45) Date of Patent: Sep. 29, 2015

(54) FUEL MANAGEMENT SYSTEM AND METHOD

(75) Inventor: Peter W. Adams, Chester (GB)

(73) Assignee: Shell Oil Company, Houston, TX (US)

( * ) Notice: Subject to any disclaimer, the term of this patent is extended or adjusted under 35 U.S.C. 154(b) by 235 days.

(21) Appl. No.: 13/522,727

(22) PCT Filed: Jan. 24, 2011

(86) PCT No.: PCT/EP2011/050915
§ 371 (c)(1),
(2), (4) Date: Jul. 18, 2012

(87) PCT Pub. No.: WO2011/089251
PCT Pub. Date: Jul. 28, 2011

(65) Prior Publication Data
US 2012/0296549 A1 Nov. 22, 2012

(30) Foreign Application Priority Data
Jan. 22, 2010 (EP) .................................. 10151437

(51) Int. Cl.
G06F 7/00 (2006.01)
G07C 5/00 (2006.01)
G05D 1/00 (2006.01)
G07C 5/08 (2006.01)

(52) U.S. Cl.
CPC .............. *G07C 5/008* (2013.01); *G05D 1/0005* (2013.01); *G06F 7/00* (2013.01); *G07C 5/085* (2013.01)

(58) Field of Classification Search
CPC ...... G07C 5/008; G07C 5/085; G05D 1/0005; G06F 7/00
USPC .......................... 701/102, 123; 705/335, 336
See application file for complete search history.

(56) References Cited

U.S. PATENT DOCUMENTS

| | | | |
|---|---|---|---|
| 5,024,142 A | 6/1991 | Vrhel, Sr. et al. | 91/271 |
| 7,715,961 B1* | 5/2010 | Kargupta | 701/29.3 |
| 8,190,533 B2* | 5/2012 | Dickman | 705/335 |
| 2003/0191566 A1 | 10/2003 | Ben-Assa | 701/29 |
| 2006/0218056 A1 | 9/2006 | Dickman | 705/28 |
| 2007/0143002 A1 | 6/2007 | Crowell et al. | |
| 2007/0150171 A1* | 6/2007 | Tengler et al. | 701/123 |
| 2007/0174004 A1* | 7/2007 | Tenzer et al. | 701/123 |
| 2010/0076878 A1* | 3/2010 | Burr et al. | 705/34 |
| 2010/0138142 A1* | 6/2010 | Pease | 701/123 |
| 2010/0262555 A1* | 10/2010 | Dickman | 705/335 |
| 2010/0332363 A1* | 12/2010 | Duddle et al. | 705/34 |
| 2011/0106368 A1* | 5/2011 | Miura | 701/29 |
| 2011/0270515 A1* | 11/2011 | Gu et al. | 701/123 |

FOREIGN PATENT DOCUMENTS

| | | | |
|---|---|---|---|
| CN | 101361098 A | 2/2009 | |
| EP | 0456425 | 11/1991 | ............... B57D 5/33 |
| EP | 1780393 | 5/2007 | ............. F02D 45/00 |
| FR | 902219 | 11/1944 | |
| FR | 2902219 A | 12/2007 | |
| WO | 2008142423 A2 | 11/2008 | |

* cited by examiner

*Primary Examiner* — Mahmoud Gimie

(57) ABSTRACT

The present invention provides a system and a method for fuel management. The invention provides an integrated system to generate reports comprising analysis relating to fuel consumption, fuel fraud, CO2 emission, driver behavior, and journey breakdown.

8 Claims, 4 Drawing Sheets

FUEL MANAGEMENT SYSTEM AND METHOD

PRIORITY CLAIM

The present application claims priority from PCT/EP2011/050915, filed 24 Jan. 2011, which claims priority from EP 10151437.0, filed 22 Jan. 2010.

The present invention relates to a system and a method for fuel management. The system and method of the invention provide means to monitor driver behaviour and fuel consumption of a vehicle, for instance to determine amount of emissions and/or to detect fuel fraud.

BACKGROUND

Besides overall costs, fuel efficiency and exhaust emissions are increasingly important aspects of a vehicle. Managers of fleets of vehicles, for instance a fleet of company cars, vans and trucks, are therefore seeking means to manage and monitor these aspects, preferably by using an integrated system that is able to monitor both individual vehicles and the entire fleet. Further, driver behaviour could have a major influence on fuel consumption. Therefore, monitoring the behaviours of the driver is also am important aspect. In addition, with increasing fuel prices, fraudulent transactions and theft occur more frequently.

There exist various methods and systems to monitor the vehicle efficiency and driver behaviour. U.S. patent application 2007174004 discloses a system and method to identify fuel savings opportunities in a fleet of vehicles based on fuel consumption corresponding to driving habits of the user. Inefficient driving habits, for example, speeding and excessive idling, unauthorized usage, provides opportunities for fuel savings. Such parameters can be monitored and fuel consumption based on the use conditions is determined. A user defined statistical metric for the fleet, or a portion of the fleet, can be determined for each of the use conditions. Fuel consumption of an individual vehicle or a group of vehicles can be compared with a larger group of vehicles, or the fleet, to determine vehicles that correspond to a metric of the fleet. Fleet managers can use this information to modify the use conditions of individual vehicles to provide fuel savings for the fleet.

U.S. Pat. No. 6,024,142-A discloses a communications system and method for communications between a vessel and a fluid management system. The communications system comprises a proximity detector configured to detect presence of a fuel nozzle in a fluid entry port of the vessel. The system also comprises a Radio frequency Identification (RFID) coupled to the proximity detector. The proximity detector, coupled with RFID interrogator, is configured to communicate whether the nozzle is in the fluid entry port. To impede theft of fuel, the method comprises the steps of establishing a first communication link between a vehicle and a fuel delivery system. Further, a second communication link between the vehicle and the fuel delivery system established. Thereafter, and the system provides the delivery of fuel based on the connectivity of the first communication link.

In addition to the two exemplary prior art systems described above, other fuel management systems are known. The present invention however aims to provide an improved and integrated fuel management system and method.

SUMMARY

The present invention provides a fuel management system comprising, a centralized processor. Further, the fuel management system includes a first module of the centralized processor, the first module configured to receive a plurality of fuel transaction data points from one or more fuelling stations. Furthermore, the system includes a second module of the centralized processor configured to receive a plurality of vehicle parameters from one or more vehicles. Furthermore, the system includes a third module of the centralized processor configured to process a part of the data received by the first module and the second module in combination with a set of information associated with each vehicle accessible to the third module. The data is processed based on a pre-defined set of rules. Further, the third module is configured to generate one or more reports providing a summary of the processing comprising analysis on one or more of fuel consumption, fuel fraud, $CO_2$ emission, driver behaviour and journey breakdown. In addition to the third module, the system includes a fourth module of the centralized processor. The fourth module is configured to store the one or more reports generated by the third module.

This system provides an integrated single user-friendly system that allows fuel fraud detection, journey breakdown details, driver behaviour details, as well as the calculation of $CO_2$ emissions, for individual vehicles as well as for (parts of) a fleet of vehicles. The system of the invention is thus more extensive than prior art systems, providing an integrated fuel management system.

BRIEF DESCRIPTION OF THE DRAWINGS

The invention will now be illustrated in more detail and by way of example with reference to embodiments and the drawing, in which.

DETAILED DESCRIPTION

Figure 1:
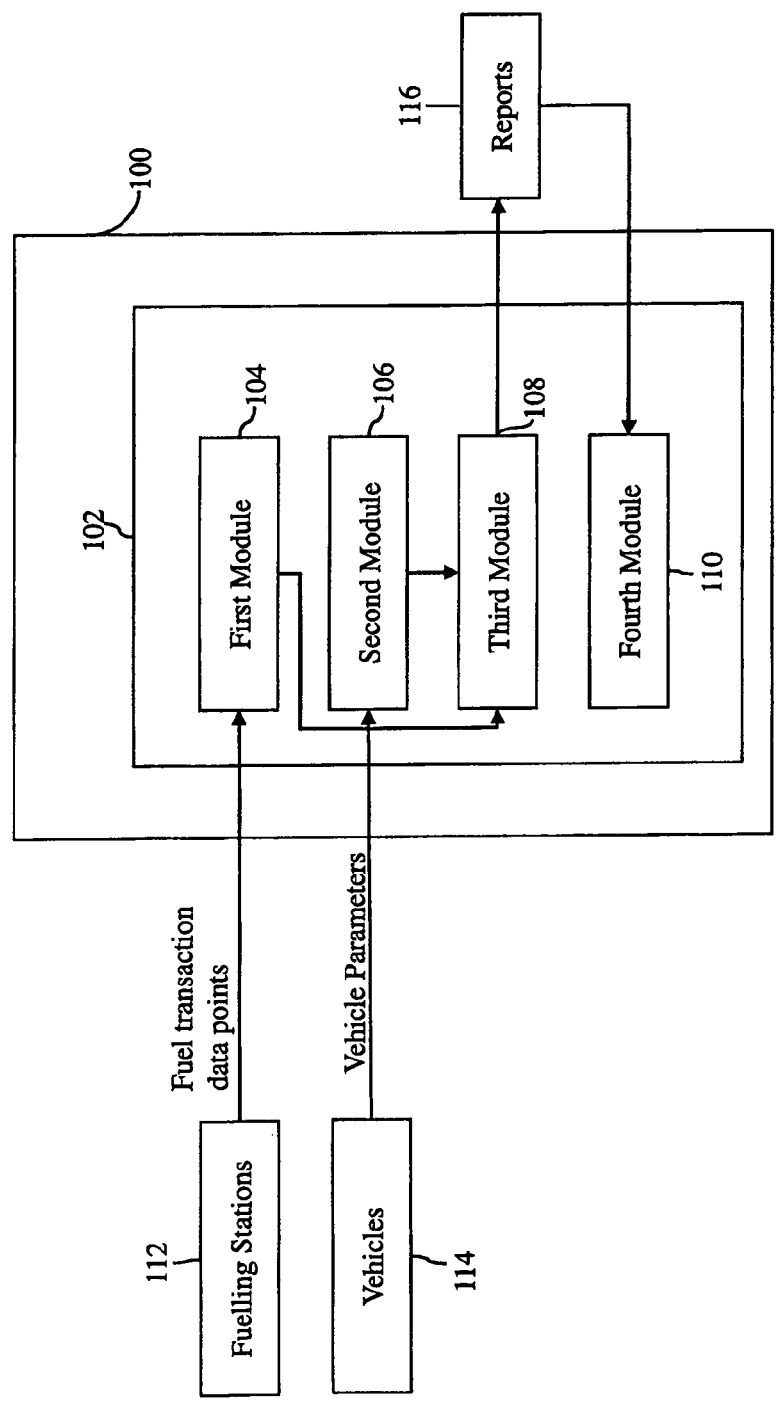
FIG. 1 shows a fuel management system and the flow of information and data in the fuel management system according to an embodiment of the present invention.

A fuel management system 100 and the flow of information and data in the fuel management system 100 according to an embodiment of the present invention, has been shown in FIG. 1. The fuel management system 100 comprises a centralized processor 102. The centralized processor 102 further includes a first module 104, a second module 106, a third module 108 and a fourth module 110. The centralized processor 102, according to an embodiment of the invention, can be any device capable of processing electronic instructions. The examples of the centralized processor include but are not limited to microprocessors, microcontrollers, computers and application specific integrated circuits (ASICs).

The first module 102 is configured to receive a plurality of fuel transaction data points. The fuel transaction data points can comprise one or more of the fuelling station location, the fuelling station number, date of transaction, time of transaction, fuel product type transacted, fuel quantity (L) transacted and used fuel card's information.

The first module 102 receives the fuel transaction data points from one or more fuelling stations 112. The fuelling stations 112 can be any one of a Euro Shell fuelling station, a home-based fuelling station, and a third party fuelling station.

The second module 104 is configured to receive a plurality of vehicle parameters. The vehicle parameters may comprise one or more of vehicle identification number, driver identification number, GPS information for the vehicle, fuel tank level change, engine torque, gear ratio, vehicle speed, vehicle acceleration, total distance covered, engine speed, brake pedal state, throttle pedal state, clutch pedal state, power take off (PTO) state, clutch pedal engagement time, brake pedal engagement time, clock time reading, odometer reading and engine coolant temperature.

The vehicle parameters are received from the one or more vehicles 114. The one or more vehicles 114 may comprise one or more passenger cars, trucks, busses/coaches etc., or any combination thereof.

The fuelling stations 112 and the vehicles 114 are configured to communicate data to the fuel management system 100 by using one or more available network connections. The available network systems can be wired or wireless networks. Preferably, the network connections include a controller area network (CAN), a media oriented system transfer (MOST), a local interconnection network (LIN), and a local area network (LAN). The network connections can also include other connections that conform to ISO, SAE and IEEE standards and specifications.

The third module 106 has access to a set of information associated with each vehicle. This set of information associated with each vehicle may comprise one or more of vehicle identification number, driver identification number, fuel card information, route maps of the vehicles, wheel radius, vehicle unladen weight, available payload capacity and historical data associated with each vehicle and driver.

Further, the third module 108 is configured to receive the data from the first module 104. The first module transmits the fuel transaction data points received from the fuelling station 112. Further, the third module also received the data for the vehicle parameters from the second module 106. Thereafter, the third module 108 is configured to process the received data, based on a set of rules. The data is processed in combination with the set of information associated with each vehicle. Thereafter, the third module 108 generates one or more reports 116. The one or more reports 116 comprise analysis on one or more of fuel consumption, fuel fraud, CO2 emission, driver behaviour, payload and journey breakdown.

The fourth module 110 is configured to store the one or more reports 116 generated by the third module 108. The one or more reports 116 can be accessed and retrieved at a later date. The fourth module can be a local storage device, a buffer memory, a random access memory (RAM), a hard drive, an optical disk, a magnetic disk, a semi-conductor memory.

The fuel management system 100 provides analysis related to Fuel Fraud, CO2 emission, driver behaviour, and journey breakdown.

Figure 2:
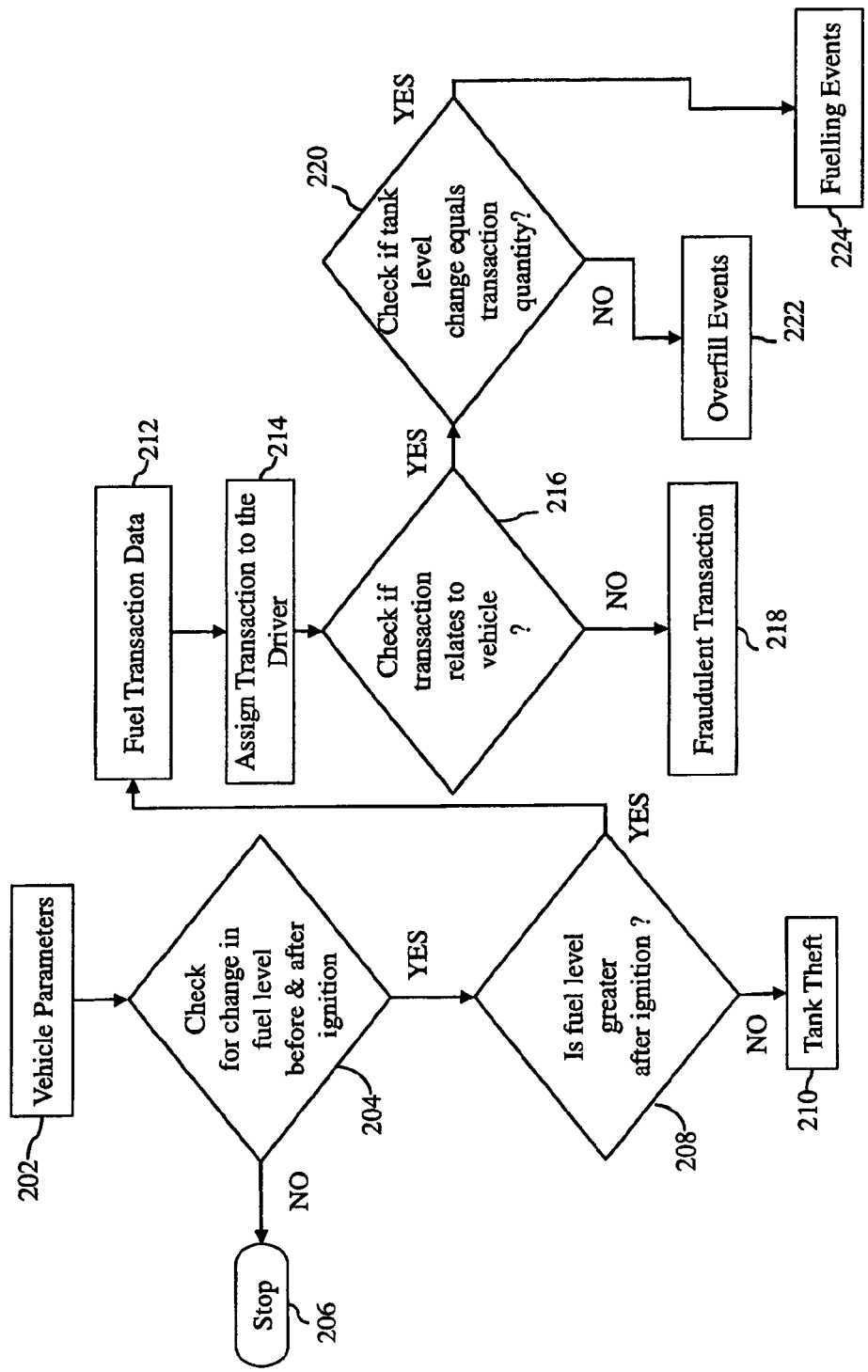
FIG. 2 shows a flow chart describing the processing of a fuel management system for fuel fraud detection according to an embodiment of the present invention.

The processing by the fuel management system 100 for detecting fuel fraud, according to an embodiment of the present invention, has been shown in FIG. 2. The vehicle parameters are received periodically from the vehicles 114 at step 202. On the event of ignition of the vehicle 114 any change in the fuel tank level before and after ignition is checked at step 204. If no change is detected then the process is stopped at step 206 until the next event of ignition. Else if a change in the tank level is detected then at step 208 the fuel management system checks if the tank fuel level is lesser after ignition. If the tank level is detected to be lesser after ignition, then a fuel theft event is reported at step 210. The report comprises information relating to the vehicle, the driver, the fuel theft quantity, the location of the event, the date and the time of the event. Else if the tank fuel level is greater after ignition then fuel transaction data points are received from the fuelling stations 112 at step 212.

At step 214 the fuel transaction is assigned to the vehicle or the driver corresponding to the fuel card used. At step 216 it is checked whether the fuel transaction corresponds to the vehicle with the change in the tank fuel level. If the fuel transaction does not correspond to the vehicle with the change in the tank fuel level then a fraudulent transaction event is reported at step 218. The report comprises information relating to the vehicle, the driver, the fuel fraud quantity, the location of the event, the date and the time of the event. Else if the fuel transaction corresponds to the vehicle with the change in the tank fuel level then the tank fuel level change is compared to the fuel transaction quantity at step 220.

If the fuel transaction quantity does not equal the tank fuel level change then a tank overfill event is reported at step 222. The report comprises information relating to the vehicle, the driver, the fuel transaction quantity, the tank fuel level change, the location of the event, the date and the time of the event. Else if the fuel transaction quantity equals the tank fuel level change then a fuelling event is reported at step 224. The report comprises information relating to the vehicle, the driver, the fuel transaction quantity, the location of the event, the date and the time of the event.

The processing by the fuel management system 100, according to a predefined set of rules, also comprises measuring and reporting total fuel consumed by the vehicles 114 over a period of time T. It should be appreciated that the period of time T can be any period of time over which the processing is required.

In practice, the period of time T will be in the order of a journey time. For instance, T can be in the range of one or more hours up to several days.

In an embodiment of the invention, the processing by the fuel management system 100, according to a predefined set of rules, comprises calculating and reporting total fuel purchased by the vehicles 114 over the period of time T.

In another embodiment of the invention, the processing by the fuel management system 100, according to a predefined set of rules, comprises measuring and reporting total potential fuel losses including the fuel theft, the fuel overfill and the fraudulent fuel transaction over the period of time T.

According to another embodiment of the invention, the processing by the fuel management system 100, according to a predefined set of rules, comprises measuring and reporting fuel discrepancy over the period of time T by calculating the difference between the purchased fuel and the total consumed fuel and the potential fuel losses.

According to yet another embodiment of the invention, the processing by the fuel management system 100, according to a predefined set of rules, comprises calculating vehicle load by using a formula:

$$[\{(((\text{Engine Torque/Gear Ratio})/\text{Wheel Radius})-(748+3.24*(\text{vehicle speed}^2)))/\text{vehicle acceleration}\}*0.8/1000].$$

The system may calculate the vehicle load, for instance using the formula above, after every time interval $t_i$. The vehicle load calculated by the fuel management system 100 at all time intervals $t_i$ is averaged over time blocks Bt. Herein, every time block comprises for instance about 5 to 100 time intervals $t_i$. In practice, each time block may be in the range of about 0.5 to 2 hours, for instance about 1 hour.

Then, each average vehicle load is distance weighted for the period of time T to calculate an average vehicle weight during the time period T.

The processing further comprises calculating the difference between the average vehicle weight during the time period T and the vehicle unladen weight to report the payload of the vehicle during the time period T. The total payload availability of the vehicle can also be used in combination with the calculated payload to determine and report payload capacity and payload performance of the vehicle.

It should be appreciated that any other suitable formula may also be used for calculating the vehicle load.

According to another embodiment of the present invention, the processing by the fuel management system 100, according to a predefined set of rules, comprises calculating and reporting bio-content of the fuel consumed by the vehicles 114. The processing for bio-content calculation comprises identifying the standard bio-content of the transacted fuel based on the fuel product type and the country of transaction. Thereafter, the bio-content is distance weighted to obtain the average bio content of the fuel.

According to another embodiment of the present invention, the processing by the fuel management system 100 according to a predefined set of rules comprises calculating $CO_2$ efficiency (g/tonne·km) by using the formula:

(Fuel consumed*2.63*(1−(0.5*BioContent)*1000))/(Payload*Total Distance).

It should be appreciated that any other suitable formula may also be used for calculating the $CO_2$ efficiency.

According to another embodiment of the invention, the processing by the fuel management system 100, according to a predefined set of rules, comprises calculating various journey breakdown features, such as Power Take Off (PTO) time by using the PTO state, the engine speed, the throttle pedal state, odometer reading, the clutch engagement time, vehicle speed. In other words, the fuel management system 100 is configured to check various journey breakdown features by calculating the duration and/or distance travelled during each of the journey breakdown events by using a time reference as input.

According to another embodiment of the invention, the processing by the fuel management system 100, according to a predefined set of rules, comprises calculating and reporting braking time and braking distance by using the vehicle speed, the brake pedal state, the odometer reading and the clock time reading as inputs.

According to another embodiment of the invention, the processing by the fuel management system 100, according to a predefined set of rules, comprises calculating coasting time and coasting distance by using the vehicle speed, the clutch pedal state, the clutch pedal engagement time, the odometer reading and the clock time reading as inputs. Preferably, if the clutch pedal is engaged for more than an average time of ten seconds, then the event is considered to be coasting event. However, if the clutch engagement time is less than ten seconds, then the event can be assumed to be a regular driving event. It should be appreciated that the time period of ten seconds is an exemplary time period and other time periods can also be used as per the specific requirements.

According to another embodiment of the invention, the processing by the fuel management system 100, according to a predefined set of rules, comprises calculating idling time by using the vehicle speed, the engine speed and the clock time reading as inputs.

According to another embodiment of the invention, the processing by the fuel management system 100, according to a predefined set of rules, comprises calculating urban distance travelled by the vehicles 114 and corresponding fuel consumed by using the vehicle speed, the brake pedal state, the brake pedal activation time, the odometer reading, the clock time reading and the fuel consumed as inputs. Preferably, the vehicle speed cut off for an urban driving event is considered to be 20 mph, urban braking pedal activation time is considered to be 30 seconds. Further, to consider the driving to be an urban driving event, the required state of 20 mph should continue for at least 1 minute. It should be appreciated that other cut off values and the threshold value of for instance 1 minute can also be used for the calculation based on specific requirements.

According to another embodiment of the invention, the processing by the fuel management system 100, according to a predefined set of rules, comprises calculating non-urban distance travelled by the vehicles 114 and the corresponding fuel consumed by using the vehicle speed, the urban driving status, the odometer reading, the clock time reading and the fuel consumed as inputs.

According to another embodiment of the invention, the processing by the fuel management system 100, according to a predefined set of rules, comprises calculating road gradient by using the vehicle GPS altitude, the vehicle speed as inputs. The calculated road gradient and the odometer reading can be further used to determine whether the vehicle 114 is driving uphill, downhill or in a flat region. Preferably, the gradient cut off is considered to be about 2% for the uphill and downhill driving calculation. It should be appreciated that other gradient values can also be used for the calculation, for instance within the range of about 1% to 5%.

According to another embodiment of the invention, the processing by the fuel management system 100, according to a predefined set of rules, comprises calculating number of stops and starts by using the vehicle speed as input.

According to another embodiment of the invention, the processing by the fuel management system 100, according to a predefined set of rules, comprises calculating number of cold starts by using the engine speed and the engine coolant temperature as inputs. Preferably, the engine coolant temperature cut off is considered to be 60 degree Celsius for cold start calculations. It should be appreciated that other temperature values can also be used for the calculation.

According to another embodiment of the invention, the processing by the fuel management system 100, according to a predefined set of rules, comprises calculating stationary time of the vehicle 114 using the engine speed, the vehicle speed and the clock time reading as inputs.

Driver Performance

According to another embodiment of the invention, the processing by the fuel management system 100, according to a predefined set of rules, comprises calculating gear ratio of the vehicle 114 by using the vehicle speed, the wheel radius and the engine speed as inputs.

According to another embodiment of the invention, the processing by the fuel management system 100, according to a predefined set of rules, comprises calculating number of gear changes by using the gear ratio and the clutch pedal state as inputs.

According to another embodiment of the invention, the processing by the fuel management system 100, according to a predefined set of rules, comprises calculating harsh acceleration time and harsh acceleration distance by using the vehicle acceleration, the throttle pedal state, the odometer reading and the clock time reading as inputs. Preferably, the harsh acceleration cut off is considered to be about 1 m/s$^2$ for the harsh acceleration time and distance calculation. It should be appreciated that other acceleration values can also be used for the calculation, for instance within the range of about 0.5 m/s$^2$ to 2 m/s$^2$.

According to another embodiment of the invention, the processing by the fuel management system 100, according to a predefined set of rules, comprises calculating harsh braking time and harsh braking distance by using the vehicle acceleration, the brake pedal state, the odometer reading and the clock time reading as inputs. Preferably, the harsh deceleration cut off is considered to be $-1$ m/s$^2$ for the harsh braking time and distance calculation. It should be appreciated that other deceleration values can also be used for the calculation, for instance in the range of $-0.5$ m/s$^2$ to $-2$ m/s$^2$.

According to another embodiment of the invention, the processing by the fuel management system 100, according to a predefined set of rules, comprises calculating harsh throttle time and harsh throttle distance by using the engine speed, the throttle pedal state, the odometer reading and the clock time reading as inputs. Preferably the harsh throttle cut off is considered to be about 90% for the harsh throttle time and distance calculation. It should be appreciated that other throttle values can also be used for the calculation, for instance within the range of about 85% to 95%.

According to another embodiment of the invention, the processing by the fuel management system 100, according to a predefined set of rules, comprises calculating over-rev time and over-rev distance by using the engine speed, the odometer reading and the clock time reading as inputs.

According to another embodiment of the invention, the processing by the fuel management system 100 according to a predefined set of rules comprises calculating harsh cold driving time and harsh cold driving distance using the engine speed, the engine coolant temperature, the odometer reading and the clock time reading as inputs. Preferably the engine coolant temperature cut off is considered to be 60 degree C. for the cold driving time and distance calculation. It should be appreciated that other temperature values can also be used for the calculation.

According to another embodiment of the invention, the processing by the fuel management system 100, according to a predefined set of rules, comprises calculating speeding events and speeding distance by using the vehicle speed, the odometer reading and the clock time reading as inputs. Preferably, the vehicle speed cut off is considered to be about 60 mph for the vehicle speeding event calculation. It should be appreciated that other speed values can also be used for the calculation, depending on the vehicle location and the local maximum speed. The vehicle speed cut off may for instance be set within the range of about 95% to 105% of the local maximum speed.

The processing by the fuel management system 100, according to an embodiment of the present invention may further comprise the processor converting at least one of the vehicle parameters and the fuel transaction data into a unit/format that can be compared with the other of the vehicle parameters and the fuel transaction data. Converting the vehicle parameters and/or the fuel transaction data can enable the two sets of data to be more easily compared with each other.

According to an embodiment of the invention tolerances can be provided in the fuel management system 100. The tolerances can take account of errors in the data recording means, and also errors that occur as part of any conversion or representation of the data. The tolerances may for instance be set at a level within the range of about 0.5% to 5%.

The system of the present invention can be fitted to existing vehicles without need for additional hardware. This renders the system versatile and enabling. The system provides comprehensive levels of analysis and/or reporting using a relatively simple information feed.

At least one or more key areas of the system, all of which may be integrated in the system, are fully automated, i.e. require no intervention of the user:
1. Calculation of payload without use of additional hardware, simply using the engine torque energy. This then enables:
   i. Empty running indication to fleet managers;
   ii. CO2 reporting in g/tonne·km; and/or
   iii. Load optimisation to maximise capacity.
2. CO2 reporting, for instance in g/tonne·km. Herein the system combines fuel efficiency with payload optimisation and bio-content of the fuel;
3. Fuel fraud mechanisms:
   i. Compares the volume of fuel contained in the fuel tank with vehicle management system indication to highlight fuel overfills, for instance at predetermined time intervals;
   ii. Knows when a fuel tank does not belong to the corresponding vehicle or driver. Herein the system highlights anomalies since the system monitors when a corresponding vehicle is refueled. If there is no event recorded by the vehicle then the fuel card assigned to the vehicle or driver is rendered (temporarily) invalid;
   iii. Monitors the fuel level in the fuel tank. When the fuel level drops and remains dropped over a predetermined time period or stabilisation cycle, the system then reports the drop as a volume irregularity;
4. Continuous and cohesive monitoring of the relationship between fuel transactions, vehicle and driver. These are the three major components of a fleet operation which then enable more tangible reporting since all elements are known at all times without additional hardware fitted in fuel stations and vehicles, other than a single black box comprising the system of the invention. Herein, hardware and software upgrades of both vehicles and fuel station sites is obviated. The system of the invention can be deployed anytime and will work on virtually any vehicle, using the torque specifications of said vehicle.

To enable payload calculation, the system of the invention is fitted to a vehicle and coupled to an on-board unit (OBU) of the vehicle. A torque specification of the respective vehicle is provided to the system of the invention. Herein, torque specification indicates the relation of the torque provided by the respective engine of the vehicle in relation to the rotations per minute (rpm) of an output shaft of said engine.

By using the relation of engine torque versus rpm, no additional hardware is required. As torque specifications are available on (almost) any vehicle or truck, the system of the invention can estimate the payload of any vehicle over the course of every shift. If the torque specification is not yet available, the torque specification can be measured and provided to the system of the invention.

Payload is estimated from a series of mass events acquired during normal driving where discrete acceleration manoeuvres are acknowledged. There is certain criterion that needs to be satisfied before each event is recorded. The acquiring process takes place on the vehicle OBU. Herein, each time block (of for instance one hour) of the driven shift may contain up to about 20 mass events. These events are processed when the OBU data reaches the core system at the end of the shift, where it will relate each event to vehicle reference data that belongs to the vehicle it was received from.

Essentially, this process is obtaining an actual torque delivery value that was necessary to physically achieve the measured acceleration that was recorded. This will result in a weight of the total vehicle, but this does not account for any losses of the torque energy due to vehicle dynamics or driveline losses through the gearbox and final drive axles. In the absence of data about real losses, generic losses will be applied to account for losses relating to drag effects due to vehicle speed and fixed losses relating to driveline.

The average of the payload estimations made for every (hourly) time block is distance weighted for the entire shift to provide a final, representative value of payload. The distance weight is important, since it acknowledges how much load was carried over certain distances and then fairly apportions this for the shift.

The length of the time block may be set depending on the required resolution or the typical length of a driving shift. Herein, the duration of a typical shift preferably comprises more than one time block. The length of the time block may be sufficient to maintain a sufficient accuracy for payload estimation whilst acknowledging changes in this payload during the shift.

If available, an engine torque curve provided by the vehicle manufacturer will be used for the calculations. If such torque curve is not available, a generic torque curve will have to be assumed, and any errors in this parameterised curve will generate an numerically equal error in the mass estimation.

The engine torque curve from each vehicle's engine is replicated using a third order polynominal. This third order polynominal is provided as input to the system of the invention, enabling the system to calculate a torque value using input from the on-board unit (OBU) relating to engine speed (e.g. in [rpm]) and/or percentage of maximum engine torque [%].

Examples for the third order polynominal representing the engine torque in relation to engine speed are (wherein R represent rotation of the output axis of the engine in rpm):
  i) torque=1E-07R^3−0.0007R^2+1.45R−240 [for a Mercedes Atego having a 6 cylinder 6.41 175 kW engine];
  ii) torque=5E-07R^3−0.0039R^2+7.8R−2076 [for a Iveco Stralis having a 6 cylinder 12.91 412 kW engine].

The error margin of the torque curve replication can be in the range 0 to about +/−10%, wherein the error margin is smaller near the top of the curve, i.e. near the maximum torque.

Figure 3:
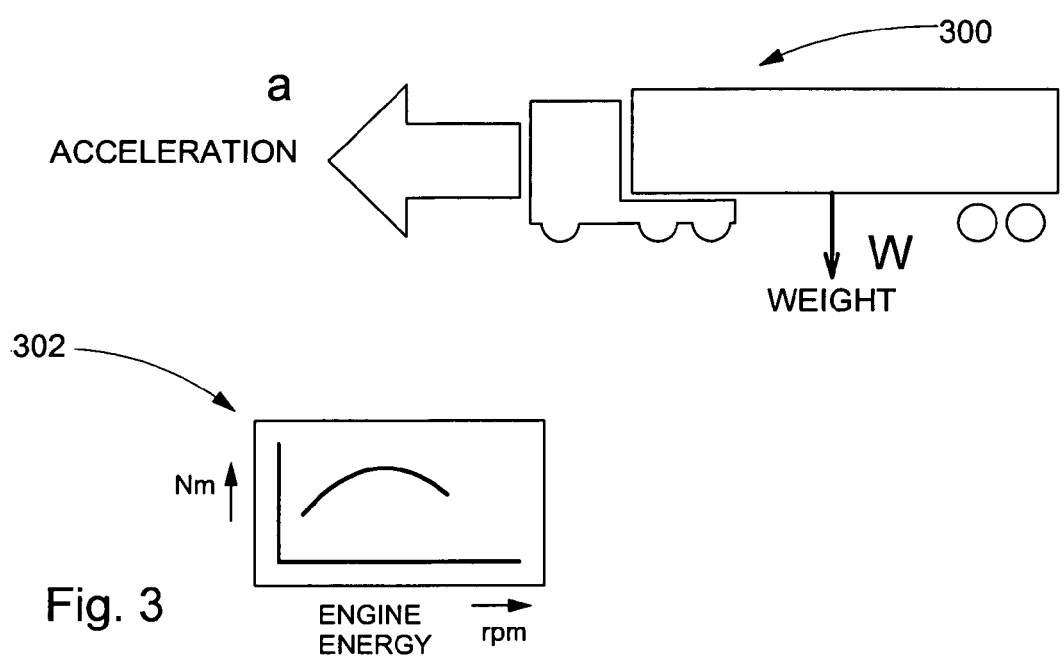
FIG. 3 shows a vehicle adapted for payload calculation according to an embodiment of the present invention.

FIG. 3 shows a vehicle 300 and its corresponding torque curve 302. The torque curve 302 shows engine speed [rpm] on the x-axis, versus engine torque T [Nm] on the y-axis. The system of the invention is coupled to the OBU of the vehicle 300. The OBU provides information relating to engine speed to the system of the invention, which uses the engine speed to calculate the engine torque. The engine torque is used to calculate the weight W of the vehicle 300 as follows.

The vehicle mass uses the following road load calculation to determine the reactive force as a function of vehicle speed:

Road Load Force $[N] = k0 + k1v + k2v^2$

Herein, v represents the velocity [m/s] of the vehicle and k0, k1 and k2 represent three different constants:
  k0—rolling resistance from the tyres, etc. (not speed dependant);
  k1—frictional losses from driveline; and
  k2—aerodynamic drag.

Herein, k0 may be in the range of for example about 200 to 800. k2 may for example be in the range of about 0 to 3.5, for instance in the range of 0.24 to about 3.24. The value of k1 is relatively small compared to k0 and k2.

The road load co-efficients will vary according to vehicle type (e.g. Rigid, tractor unit, etc.). The examples provided above indicate the extremes of typical co-efficients and they have been applied in combinations to observe the effect upon the mass estimation accuracy. Herein, the error margin remains between 0 to +/−8%. As a result, incorrect co-efficients being applied to vehicle data do not have a significant impact upon the result of the mass estimation method, i.e. have only an acceptable impact allowing the mass estimation to remain within pre-set error margins.

The system of the invention uses the following inputs from the on-board unit (OBU) for the real-time mass (and hence load) estimation:
  i) Accelerator Pedal Position [% of max.];
  ii) Engine Speed [rpm];
  iii) Tachometer Vehicle Speed [km/hr]; and/or
  iv) Engine Torque [% of max.].

Using one or more of the parameters above, typically two of the parameters i) to iv), other parameters can be calculated, such as:
  v) Actual Engine Torque [Nm];
  vi) Gear Ratio [ratio between engine and wheel speed];
  vii) Vehicle Acceleration [m/s$^2$];
  viii) Vehicle Speed [m/s].

Other inputs to the system may include constants or may be specific to the respective vehicle (engine, year, model, weight of empty vehicle). Such other inputs may be referred to during post-processing of data. The other inputs may include:
  ix) Actual Torque Curve (provided by manyfacturer, for each specific engine and type of vehicle);
  x) Road Load Constants (e.g. artic, tropical, dirt road, rigid, etc.);
  xi) Rolling Radius of Driven Wheel [m].

These data parameters are captured using a pre-set resolution. The resolution may be in the order of about 1 Hz to 5 Hz. The latter provides sufficient resolution to enable the estimation process, and is supported by most logging devices.

Given the above, the system of the invention is able to make the following calculations to arrive at the cumulative average vehicle mass [kg].

Using vehicle speed (in [mph] or [km/hr], as provided by the tachometer of the vehicle) and the wheel radius [m] as two inputs, the system can calculate the wheel speed [rotations/min]:

Wheel Speed=(vehicle speed [mph]*1.609*(1000/60))/2*PI*wheel radius [m].

Using the wheel speed and the engine speed (in [rpm], as provided by the OBU):

Gear Ratio=Wheel Speed [rpm]/Engine Speed [rpm]

Acceleration of the vehicle is calculated from the change of vehicle speed over time pre pre-set time period. The acceleration may be calculated on a 0.5 to 10 Hz, for instance about 1 Hz basis. This corresponds to a time period of about 0.1 to 2 sec. The acceleration value is used to acknowledge an acceleration or deceleration event, and/or to use the absolute acceleration in the mass estimation.

Vehicle speed is provided by the tachometer in [mph] or [km/hr]. This value is converted to a corresponding value in [m/s]. The change in vehicle speed between two subsequent times is used to calculate the vehicle acceleration in [m/s^2].

Using the inputs described above, the mass of the vehicle 300 can be calculated when the gear ratio is constant and the vehicle accelerates, within a defined window. When this criterion is met, the system of teh invention will calculate and output a mass estimation (in [kg]). This calculation can happen during vehicle operation, and may generate many mass estimations per hour. The frequency of the estimations is dictated by the environment wherein the vehicle is operating. For example, driving on 'A' and 'B' type roads may generate more estimations than the relatively constant speed driving on a highway. The acceleration manoeuvre is monitored over the time period mentioned above (0.5 to 10 Hz) and the acceleration value used in the calculation will be an average over two or more of these time periods.

The vehicle mass calculation equation includes a fixed, nominal correction factor of 80% that relates to the drivetrain efficiencies. It represents typical losses that are prevalent in drivetrains which are normally associated with frictional losses, for example. When the vehicle's journey is complete the individual mass estimations are averaged. Later in the report, data is presented which illustrates how the estimation converges upon a final value.

Figure 4:
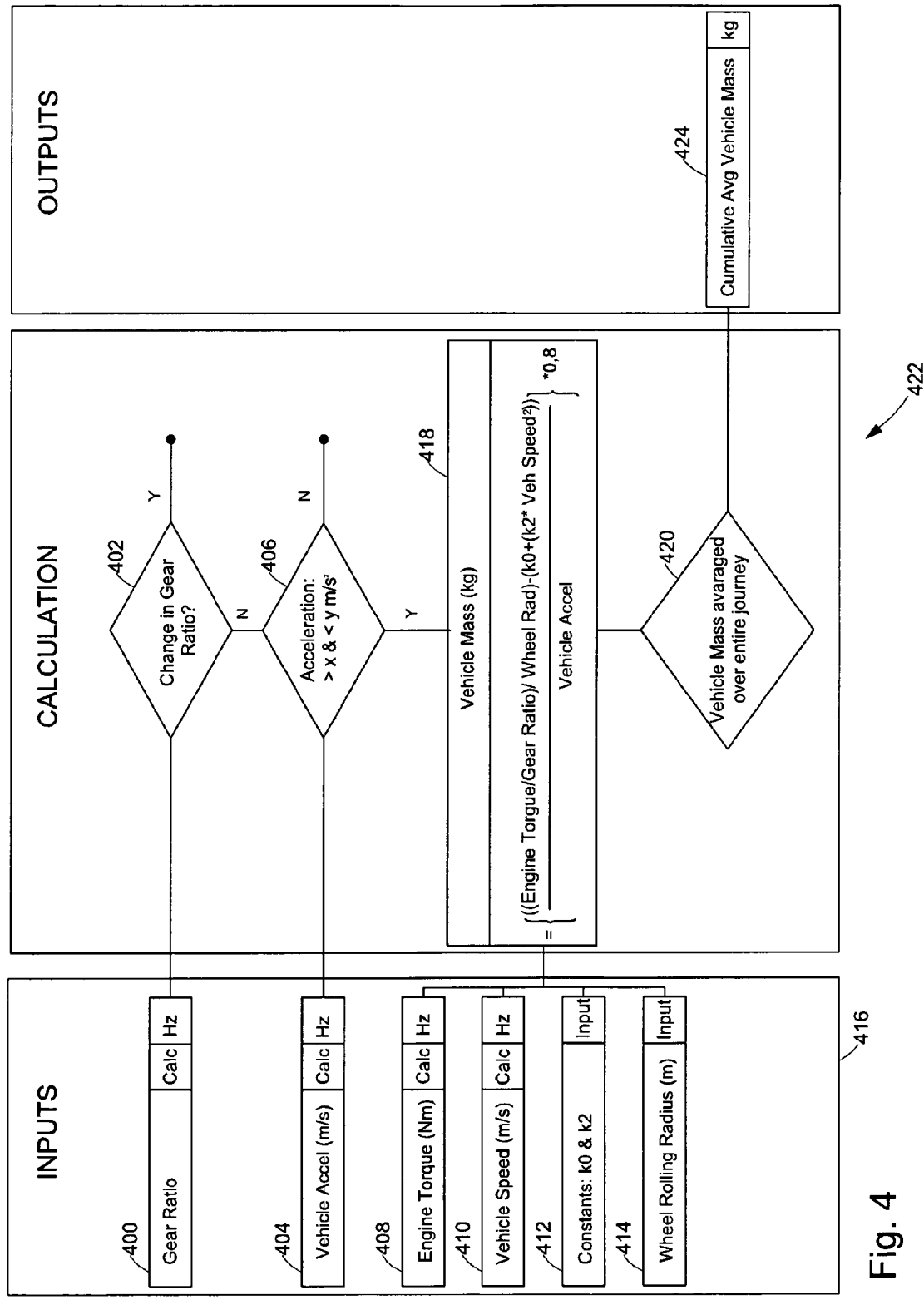
FIG. 4 schematically shows an embodiment of a system of the present invention coupled to a vehicle.

As shown in FIG. 4, the gear ratio 400 is calculated as indicated above. Input block 416 is indicated. When the gear ratio changes, this is recorded as a trigger at 402. As long as the gear ratio remains constant, the vehicle acceleration 404 can be used to calculate the vehicle mass, and is forwarded at 406. Herein, the vehicle acceleration preferably is within the range of 0.5 to 0.75 m/s^2.

Using inputs engine torque 408 in [Nm], Vehicle speed 410 in [m/s], constants 412 (k0-k2 etc.), wheel radius 414 in [m], the vehicle mass 418 in [kg] can be calculated at:

$$\text{Vehicle mass} = 0.8 * \{((\text{Engine Torque/Gear Ratio})/\text{Wheel Radius}) - (k0 + (k2 * \text{Vehicle Speed}^2))\} / \text{Acceleration}.$$

The vehicle mass is averaged over the entire journey of the vehicle at 420. Thus, the system 422 is able to provide a cumulative average vehicle mass 424.

$CO_2$ Reporting (g/tonne·km)

The reporting of $CO_2$ in gram of $CO_2$ per tonne of payload per km driven is typically difficult to obtain due to the fact that vehicles need to be equipped with additional hardware in the form of axle weight sensors.

The system of the invention allows both fuel efficiency and payload capacity utilisation to be monitored at the same time. It combines the following elements:
  Fuel Economy (affected by payload, driving style, truck type, route, etc.);
  Payload and Capacity Used (distance weighted average for every vehicle for every shift);
  Bio-Content (uses legislated % for each country of purchase/dispensing);
  Since this is calculated for every vehicle/driver, reporting can be made upon any level from individual truck to a depot, division, customer group or total fleet, for example.

Fuel Fraud Mechanisms

The basis of this area is that there is total automation and recognition of circumstances which may be conducive to fraudulent activity. Typically, additional hardware needs to be installed at both fuel sites and vehicle fuel tanks to enable such functions, whereas the present system alleviates this requirement which then enables this to be applied to any vehicle and any fuel site, making it flexible and non-discriminating.

Since every vehicle recognises and stores its own event when it is re-fuelled, it then uses this in a matching process where fuel transactions from the pump are compared with vehicle's account of the event.

At this point the following are reviewed of both the transaction and vehicle fuel event:
  Date/Time
  Location
  Fuel quantity
  Vehicle and Driver
  Type of fuelling site—Shell, non-Shell, customer home-base, etc.

Capturing of vehicle fuel events also caters for instances where the fuel tank is re-fuelled with the engine running, since it is looking for successive tank level changes over defined periods.

The system can deal with both fuel cards registered to either a driver or a vehicle. Where driver registered cards are employed, the connection to the vehicle is made via the digital tachograph or PIN code issued to the driver. Should the driver not identify himself during driving or re-fuelling, then an alert is raised.

With this information, the following can be reported during a process of matching:

1. Fuel Overfills

Once it has been established that the fuel transaction(s) belong to the vehicle fuel event, then the actual volumes may be compared. Where there is more fuel dispensed than the vehicle's account of the volume received, then the difference is reported as an overfill within a customisable tolerance 2. Invalid Fuel Transactions If the matching process reveals that a fuel transaction does not belong to a particular vehicle, then this considered an invalid transaction since it cannot be accounted for. In this situation, the system will attempt to find a truck within the fleet that the transaction may belong to, if the fuel card has been used on another truck, for example.

3. Fuel Tank Level Drop

Fuel level is monitored through a stabilisation algorithm which damps the fuel level signal and reports any new level when there are 3 successive level readings over a defined time interval within a defined tolerance—this reduces the risk of reporting false level changes during normal operation of the truck If there are instances where the fuel tank level drops beyond a defined threshold, then an alert is raised The user of the system is presented with graphical representation of fuel reconciliation which enable quick identification of issues surrounding fuel accounting in a vehicle or fuel card centric perspective.

This allows a performance measure to be applied "Reconciliation Performance" which then grades how successful the accounting of fuel has been.

The user may then use the following screens to visualise reconciliation to help understand the causes surrounding any issues. Vehicle fuel events on the top of the calendar bar should have corresponding fuel transactions below the bar. Green=all ok, Red=issues.

The invention is described above with reference to vehicles. The system of the present invention may for instance be adapted to many other means of transport, such as vessels.

Many modifications of the above-described embodiments of the invention are conceivable within the scope of the appended claims. Features of respective embodiments can for instance be combined.

What is claimed is:

1. A fuel management system comprising:
  a centralized processor;
  a first module of the centralized processor configured to receive a plurality of fuel transaction data points from one or more fuelling stations;
  a second module of the centralized processor configured to receive a plurality of vehicle parameters from one or more vehicles;
  a third module of the centralized processor configured to process, according to a pre-defined set of rules, at least a part of the data received by the first module and the second module in combination with a set of information associated with each vehicle accessible to the third module, and to generate one or more reports providing a summary of the processing comprising analysis on fuel consumption, fuel fraud, CO2 emission, driver behavior and journey breakdown, and to calculate the vehicle mass in real-time, using mass inputs, to determine a distance weighted average payload of the vehicle; and a fourth module of the centralized processor configured to store the one or more reports generated by the third module.

2. The fuel management system of claim 1, wherein the fuel transaction data points comprises one or more of the fuelling station location, the fuelling station number, date of transaction, time of transaction, fuel product type transacted, fuel quantity transacted and used fuel card's information.

3. The fuel management system of claim 1, wherein the vehicle parameters comprises one or more of vehicle identification number, driver identification number, GPS information for the vehicle, fuel tank level change, engine torque, gear ratio, vehicle speed, vehicle acceleration, total distance covered, engine speed, brake pedal state, throttle pedal state, clutch pedal state, power take off (PTO) state, clutch pedal activation time, brake pedal activation time, clock time reading, odometer reading and engine coolant temperature.

4. The fuel management system of claim 1, wherein the set of information associated with each vehicle comprises vehicle identification number, driver identification number, fuel card information, route maps of the vehicles, wheel radius, vehicle unladen weight, available payload capacity and historical data associated with each vehicle and driver.

5. The fuel management system of claim 1, wherein the processing according to a predefined set of rules comprises determining if there is an anomaly between the fuel quantity transacted and the fuel tank level change in the vehicles and generate a fuel fraud alert if an anomaly is determined or else log the fuel transaction process as a refuelling event.

6. The fuel management system of claim 1, wherein the processing according to a predefined set of rules comprises determining the standard bio-content of the transacted fuel product type and then distance weighting the bio-content to report the average bio-content of the fuel used.

7. The fuel management system of claim 1, wherein the processing according to a predefined set of rules comprises determining the CO2 efficiency of the plurality of vehicles based on fuel volume used, average bio-content of the fuel used, distance weighted average payload of the vehicle and the total distance traversed.

8. A method for fuel management comprising:
receiving a plurality of fuel transaction data points at a centralized processor from a plurality of fuelling stations;
receiving a plurality of vehicle parameters at the centralized processor from a plurality of vehicles; and
processing, using the centralized processor, according to a pre-defined set of rules, at least a part of the fuel transaction data points and the vehicle parameters in combination with a set of information associated with each vehicle accessible to the centralized processor;
calculating a vehicle mass for at least one of the plurality of vehicles in real-time, using mass inputs, to determine a distance weighted average payload of the at least one vehicle;
generating one or more reports providing a summary of the processing comprising analysis on fuel consumption, fuel fraud, fuel theft, fuel overfill, CO2 emission, driver behavior and journey breakdown; and
storing the one or more reports generated in a memory unit of the centralized processor.

* * * * *